United States Patent [19]
Kawahara

[11] 3,817,619
[45] June 18, 1974

[54] DEVICE FOR MEASURING DISTANCE OF AN OBJECT FROM THE FORWARD END PORTION OF AN ENDOSCOPE

[75] Inventor: Ichizo Kawahara, Tokyo, Japan

[73] Assignee: Olypus Optical Co., Ltd., Tokyo, Japan

[22] Filed: June 2, 1972

[21] Appl. No.: 259,203

Related U.S. Application Data

[60] Continuation-in-part of Ser. No. 114,242, Feb. 10, 1971, abandoned, which is a division of Ser. No. 749,809, Aug. 2, 1968, Pat. No. 3,595,200.

[30] Foreign Application Priority Data

| Aug. 8, 1967 | Japan | 42-50507 |
| Aug. 8, 1967 | Japan | 42-50508 |
| Aug. 8, 1967 | Japan | 42-50510 |
| Aug. 29, 1967 | Japan | 42-73425 |

[52] U.S. Cl. ............................ 356/1, 356/9, 128/6
[51] Int. Cl. ..................... G01c 3/00, A61b 1/06
[58] Field of Search ............ 356/1, 3, 8, 17, 21, 51, 356/9, 156; 350/301; 128/4, 7, 5, 8, 6, 9, 397

[56] References Cited
UNITED STATES PATENTS

| 2,505,983 | 5/1950 | Mills | 356/1 |
| 2,547,232 | 4/1951 | Schwartz et al. | 356/1 |
| 3,534,729 | 10/1970 | Sakamoto | 128/6 |

*Primary Examiner*—Ronald L. Wibert
*Assistant Examiner*—Paul K. Godwin
*Attorney, Agent, or Firm*—Kurt Kelman

[57] ABSTRACT

The invention disclosed provides a device for measuring the distance of an object from the forward end portion of an endoscope adapted to be inserted into a hollow portion of a living body or the like for the inspection thereof. The forward end portion of the endoscope is connected to a control housing through an elongated tube. The image of an object being viewed is formed in the forward end portion of an objective lens system, and the image is transmitted through the elongated tube by an ocular means provided in the control housing. The distance between the object and the forward end portion of the endoscope is determined using two beams of light emitted from the forward end portion toward the object so as to form a pair of light spots thereon. The distance of the object from the forward end portion of the endoscope may be determined by measuring the relative positions of the light spots with respect to the field of view of the endocope. The distance of the object may also be determined by measuring the amount of change in direction of either or both of the beams of light required to bring the two light spots appearing in the field of view into registration.

4 Claims, 12 Drawing Figures

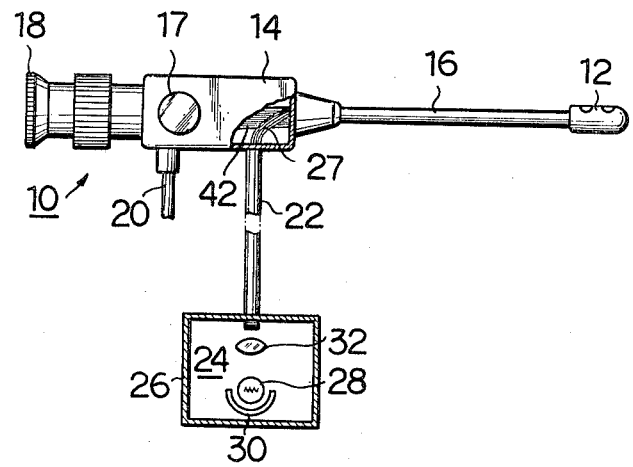
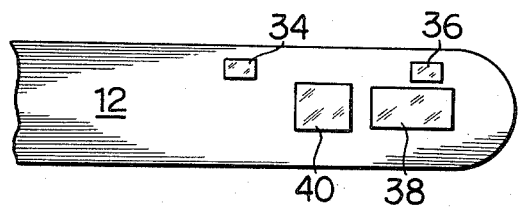
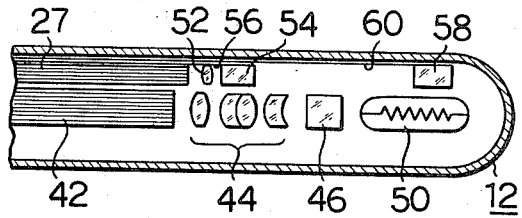
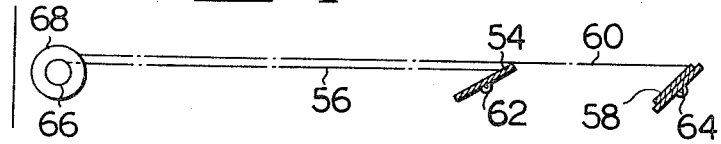

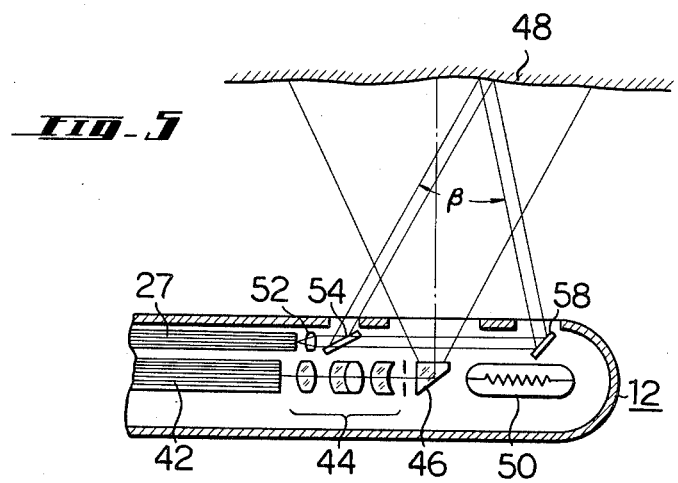
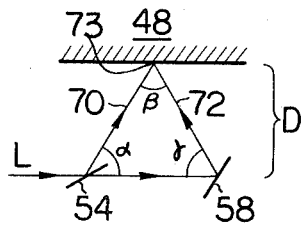
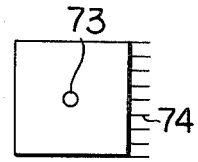
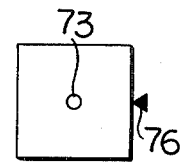
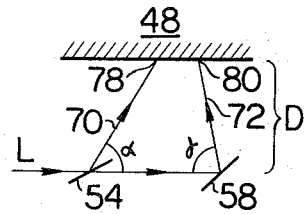
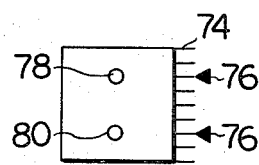
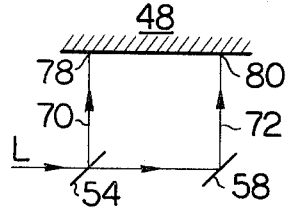
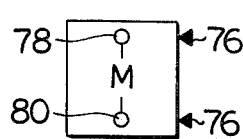

DEVICE FOR MEASURING DISTANCE OF AN OBJECT FROM THE FORWARD END PORTION OF AN ENDOSCOPE

This application for U.S. Letters Patent is a continuation-in-part of copending U.S. application Ser. No. 114,242, filed Feb. 10, 1971 now abandoned, which in turn is a divisional of U.S. application Ser. No. 749,809, filed Aug. 2, 1968, now U.S. Pat. No. 3,595,200, issued July 27, 1971.

The present invention relates to a device for measuring the distance of an object from the forward end portion of an endoscope adapted to be inserted into a hollow portion of a living body or the like for the inspection thereof.

In using an endoscope, it is necessary to successively and intermittently observe an object such as a part of a hollow portion of a living body, in order to find out how the portion to be inspected changes with time. In comparing the results of an inspection with those obtained by previous inspections, it is necessary to accurately find out the distance between the object and the forward end portion of the endoscope in order to exactly determine the actual dimension of the object, or the actual dimension of the field of view, such that correct judgement can be made on any variation in object size with time.

Heretofore, the amount of adjustment of focus of the objective lens system of the endoscope for sharply focusing the object was by assuming the distance between the object and the forward end portion of the endoscope. However, since wide angle objective lens systems having a relatively greater depth of focus are now being incorporated in endoscopes, the exact adjustment of the focus is very difficult thereby lowering the accuracy of the inspection.

In another prior art method, a light beam having a predetermined intensity is emitted from the forward end portion of the endoscope so as to illuminate the object. The light reflected from the object is received by a sensing means provided in the forward end portion of the endoscope such that the intensity of the reflected light is converted into an electrical value from which the distance between the object and the forward end portion of the endoscope is estimated. However, the reliability of this method for determining the distance is relatively low because the angle formed between the optical axis of the objective lens system and the normal to the surface of the object tends to vary each time the inspection is effected by the endoscope thereby resulting in the variation in the light quantity received by the sensing means.

It has now been found that by practice of the present invention, there is provided a device which overcomes many of the disadvantages of endoscopes of the prior art, and thus provides a novel and useful device for measuring the distance between the object and the forward end portion of the endoscope.

Generally, the present invention provides a novel and useful device for measuring the distance between an object and the forward end portion of an endoscope adapted to be inserted into a hollow portion of a living body or the like for the inspection thereof.

In principle, the present invention utilizes two beams of light, generally of condensed parallel rays, emitted from the forward end portion of the endoscope toward the object. The emitted light beams form bright light spots on the surface of the object. The thus formed light spots are viewed through the endoscope together with the image of the object. The relative positions of the light spots with respect to the field of view thus provide means for measuring the distance to the object.

The distance between the object and the forward end portion of the endoscope may be determined on the basis of the relative positions of the light spots with respect to the field of view of the endoscope as measured by means of graduations arranged in the focal plane of the ocular means, or by means of a movable index mark arranged in the focal plane of the ocular means. The relative positions of the light spots may be controlled by a control mechanism provided in the control housing of the endoscope with means connecting to the light beam emitters, i.e., light reflecting mirrors, in the forward end portion of the endoscope. Preferably, an elongated tube of the device is included which is flexible and controlled by control means provided in the control housing.

The direction of either or both of the light beams may be controlled by operating a control mechanism provided in the control housing of the endoscope. When the direction of either or both of the light beams is changed, the position of the light spots formed on the surface of the object are varied. Thus, when the two light spots are brought into registration with each other or into a predetermined relation with respect to the field of view, the distance between the object and the forward end portion of the endoscope is determined on the degree of change required.

Other features of the present invention will become more apparent from the following detailed description of the present invention taken with reference to the accompanying drawings.

In the drawings:

FIG. 1 is a side elevational view having parts taken in section illustrating an endoscope of the present invention;

FIG. 2 is a partial view showing the top forward end portion of the endoscope of FIG. 1 as seen from the object being viewed;

FIG. 3 is a fragmentary sectional view illustrating generally the internal portion of that forward end portion shown in FIG. 2;

FIG. 4 is a general showing of means for changing direction of light beams for measuring distances;

FIG. 5 is a fragmentary side sectional view of the forward end portion of the endoscope of FIG. 2 illustrating how distance may be measured;

FIG. 6 diagrammatically illustrates how measurement of distance may be effected when light beams form one spot on the object;

FIG. 7 illustrates how registration of beams of FIG. 6 may appear through an ocular means;

FIG. 8 illustrates a variation of FIG. 7 including a separate indicator;

FIG. 9 illustrates how measurement of distance may be effected when light beams are non-parallel and form two light spots on the object;

FIG. 10 illustrates how registration of the light beams of FIG. 9 may appear through an ocular means;

FIG. 11 illustrates how measurement of distance may be effected when light beams are parallel and form two light spots on the object; and FIG. 12 illustrates how registration of the light beams of FIG. 11 may appear through an ocular means.

Referring to the drawings, FIG. 1 illustrates device 10 for measuring the distance in accordance with the present invention. The endoscope shown comprises a forward end portion 12 connected to a control housing 14 by means of elongated tube 15, which is preferably an elongated flexible tube. Control housing 14 is provided with a focus adjusting means 17, an ocular means 18, and electric power supplying lead wires 20. Means (not shown) for effecting the bending of elongated tube 16 may be also advantageously included in the present device.

Flexible tube 22 through which light may pass such as by means of optical fibers or the like, may be detachably secured to housing 14 and provides conduit means for passing light from unit 24 to optical fibers 26. Light unit 24 may include casing 26, light source 28, light reflector 30, and light ray condenser 32 as desired.

FIG. 2 presents a partial top view of forward end portion 12 of the present endoscope. Light beams having parallel rays pass through windows 34 and 36 respectively, light from a suitable light source from portion 12 passes through illumination window 38, and viewing may be effected using window 40.

FIG. 3 presents generally, an example of arrangement of elements within the housing of the forward end portion 12 of the present endoscope.

As seen in FIG. 3, an image transmitting optical system 42, such as a fiber optical system by way of example, extends through elongated tube 16 from control housing 14, to the forward end portion 12 of the endoscope. An objective lens system 44 is provided in the forward end portion 12 in front of the forward end of the image transmitting optical system 42 in the optical axis thereof. A light reflecting means 46 such as a prism, is located in front of the objective lens system 44. Thus, light from an object 48, FIG. 5, passing through viewing window 40 is reflected by light reflecting means 46 toward and through the objective lens system 44 and to the forward end, in housing 14, of optical system 42 to form an image of the object which may be viewed through ocular means 18. The image formed on the forward end surface of the image transmitting optical system 42 is transmitted therethrough to the rearward end thereof, i.e., the end part within housing 14. The rearward end of the image transmitting optical system 42 is located in the control housing 14 in front of the ocular means 18, thereby permitting the thus transmitted image of the object to be viewed through the ocular means 18. Adjustment of the focusing of the objective lens system 44 can be effected by means of the focus adjusting means 17.

A light source 50, such as a lamp or the like, is located in the forward end portion 12 and may be energized by an external power source through wires 20 extending from the control housing 14 through the elongated tube 16. Light source 50 illuminates the object through the window 38. The light source 50 may be replaced by a light conducting fiber optical system extending through the elongated tube 16 from the control housing 14 to the forward end portion 12. In this case, the rearward end of the light conducting fiber optical system adjacent to or in control housing 14 is illuminated by an external light source, i.e., simply light source 50 externally disposed, and the light transmitted through the light conducting fiber optical system to the forward end thereof is emitted therefrom toward the object by way of light illumination window 38.

In accordance with one of the features of the present invention, a light projecting means for emitting a pair of light beams is provided in order to measure the distance between object 48 and the forward end portion 12 of the endoscope. The light projecting means comprises a single fiber optical system 26, a single collimating lens system 52, a semi-transparent light reflecting mirror 54, movable by wire means 56, and a total light reflecting mirror 58 movable by second wire means 60. Mirrors 54 and 58 are located obliquely in the optical axis of the collimating lens system 52. Mirror 58 is remotely spaced from semi-transparent light reflecting mirror 54 such that two light beams may be directed from mirrors 54 and 58 toward object 48.

Fiber optical system 26 extends from the control housing 14 through the elongated tube 16 to the forward end portion 12. The rearward end of the fiber optical system 26 adjacent to or in the control housing 2 is illuminated by an external light source 24 such that the light is transmitted through the fiber optical system 26 to the forward end from which it is emitted. The light emitted from the forward end of the fiber optical system 26 is collimated by the collimating lens system 52 to form a fine light beam having parallel rays. The light beam is reflected partly by the semi-transparent light reflecting mirror 54 toward the object 48 through a window 34 provided in the wall of the forward end portion 12. The remaining part of the light beam passing through semitransparent light reflecting mirror 54 is reflected by total light reflecting mirror 58 toward the object 48 through a window 36 provided in the wall of the forward end portion 12.

Thus, light beams having substantially parallel rays project to the object 48 from the light reflecting means 54 and 58 to form two small light spots on the surface of the object 48. These light spots may then be viewed through the viewing optical system comprising, viewing window 40, light reflecting means 46, objective lens system 44, image transmitting optical system 42 and ocular means 18, together with the field of view available by the objective lens system 44.

In one form of the present invention illustrated in FIG. 4, the direction of either one or both of the two light beams may be varied. Wire means 56, for example, may be included to vary the angle of mirror 54 when disposed on supporting pivotal axis 62, and/or wire means 60 may be included to similarly vary the angle of mirror 58 when supported on pivotal axis 64. Wire means 56 may be moved for mirror varying purposes by control knob 66 disposed relative housing 14, and wire means 60 may be moved for mirror varying purposes by control knob 68 similarly disposed as desired. Either one or both of control knobs 66 and 68 may be referenced to indicating marks for noting either the angle of the mirror, or the distance being measured.

In another form of the present invention illustrated in FIG. 5, the direction of each of the two light beams is fixed so that they are directed at known fixed angle to the object 48 within the field of view available by the objective lens system 44. FIG. 5 also presents an illustration of how measurement may be effected using the device of the present invention.

FIG. 6 diagrammatically presents elements of FIG. 5 exclusive of detail. Light beam L from collimating lens system 52 partially reflects as beam 70 from mirror 54, and the remainder reflects as beam 72 from mirror 58.

The light beams 70 and 72 may be positioned to cross each other at an angle $\beta$ at a certain distance from the forward end portion 12 and measurement D may thus be effected. Also, the angle $\beta$ may be made zero, i.e., the two light beams may be made parallel to each other in which case measurement is effected such as described subsequently.

The positions of the two light spots relative to each other with respect to the field of view of the endoscope as seen in the focal plane of the ocular means 18 vary as the distance D of the object from the forward end portion 12 varies when the angle $\beta$ is set to a fixed value. Therefore, the distance D between object 48 and the forward end portion 12 can be determined on the basis of the relative positions of the two light spots with respect to the field of view as seen in the focal plane of the ocular means 18, noting FIG. 7.

Graduations 74 are provided in the focal plane of the ocular means 18 as shown in FIG. 7. The location of the graduations 74 is so determined that it extends in the direction corresponding to the location of the plane including the optical axis extending from the light-reflecting mirrors to the object 48.

When the distance between the object 48 and the forward end portion 12 of the endoscope is varied, for example, then the position of the light spot formed by the light beams on the surface of the object 48 as viewed through the ocular means also varies with respect to the field of view available, thereby permitting the position of the light spot 73 to be read out by means of the graduations 74. Thus, the distance between object 48 and the forward end portion 12 can be determined by the medium of the graduations 74 provided in the focal plane of the ocular means 18 to serve as a light spot reference point for fixing distance D.

Alternatively, a movable index mark 76 of FIG. 8 may be provided in place of the graduations 74 so that the index mark 76 or the image thereof formed by a conventional optical system is moved in the focal plane of the ocular means 18 by means of a control knob provided on the control housing 14. The movement of the index mark 76 is controlled by the control knob so that the index mark 76 is brought into registration with the light spot as viewed in the focal plane of the ocular means 18. Thus, the distance of the object 48 from the forward end portion 12 is determined on the basis of the amount of the operation of the control knob for bringing the index mark 76 into registration with the light spot. To this end, an indicating means may be provided in the control housing which indicates the amount of movement of the control knob in terms of the distance of the object 48 from the forward end portion 12 of the endoscope.

Further illustrations of how present measurement may be effected using the present device are disclosed in parent application, now U.S. Pat. No. 3,595,220, the disclosure of which is incorporated herein by reference.

Thus, with reference to FIGS. 5–8, measurement of distance D may be effected as follows. Mirror 54 and 58 are fixed in position thereby fixing angles $\alpha$ and $\gamma$ respectively. When the beams of light 70 and 72 cross at the object 48, and when the resulting spot 73 appears at a pre-determined reference location using reference lines 74, by way of example, within the field of view, then the value D becomes known. This determination is thus based on simple mathematics.

FIGS. 9 and 10 present the situation, for example, when the reflecting angle of either one or both of mirrors 54 and 58 vary. The procedure is essentially the same as that indicated previously except two spots 78 and 80 are involved. Since the mirror angles are predetermined by using means illustrated in FIG. 4, angles $\alpha$ and $\gamma$ of beams 70 and 72 also become known. Simply, measurement may be effected using spots 78 and 80 when registered into a reference location such as FIG. 10.

Referring to FIGS. 11 and 12, when angle $\beta$ is set to zero, the coincidence of the two light spots 78 and 80 do not occur. However, the apparent distance between the two light spots as viewed in the focal plane of the ocular means 18 varies as the distance of the object 48 from the forward end portion 12 varies. Therefore, the distance D of the object 48 from the forward end portion 12 can be determined on the basis of the distance M between the two light spots 78 and 80 with respect to the field of view of the endoscope, noting FIG. 12.

Thus, in accordance with a feature of the present invention, either one or both of the light reflecting mirrors 54 and 58 can be rotated by the operation of a control mechanism of FIG. 4 with knobs 66 and 68 provided on control housing 14. Either one or both of the light reflecting mirrors 54 and 58 may be rendered movable such that either one or both of the light spots formed on the surface of the object 48 may be moved to bring the two light spots into registration with each other, i.e., the FIG. 6 illustration, or into a predetermined relation with respect to the field of view, i.e., the FIG. 9 illustration. The amount of the operation of the control mechanism for bringing the two light spots into registration with each other or into a predetermined relation with respect to the field of view varies according to the distance D between the object 48 and the forward end portion 12. Therefore, the distance D of the object 48 from the forward end portion 12 can be either directly determined or suitable means are included for providing read out of the distance D on the control housing. In the latter case, distance markings may be included relative to knobs 66 and 68 for direct readings, and operably connected, using the unit of FIG. 4, such to indicate the amount of the rotation thereof in terms of the distance.

It will be apparent from the foregoing that the present device provides great versatility, great efficiency and simplicity of construction affording wide use.

The various elements of the present device may be secured to adjoining elements by any suitable means.

Although a preferred embodiment of the present invention has been illustrated herein, it is to be understood that various changes and modifications may be made in the construction and arrangement of elements without departing from the spirit and scope of the invention as defined.

What is claimed is:

1. In a device for measuring the distance of an object from the forward end portion of an endoscope adapted to be inserted into a hollow portion of a living body or the like for the inspection thereof, said endoscope comprising a control housing, an elongated tube, said control housing being connected to said forward end portion through said elongated tube, an image transmitting optical system extending through said elongated tube and an objective provided in said forward end portion in front of the forward end of said image transmitting optical system, said image transmitting optical system transmitting an image of the oject formed on the forward end thereof by said objective lens system the rearward end in said control housing thereby permitting the thus transmitted image to be viewed through ocular means provided in said control housing wherein the improvement comprises, light projecting means for emitting a pair of light beams toward the object from said forward end portion of the endoscope at positions each a certain distance spaced from said objective lens system so as to form two light spots on the surface of the object inspected through the endoscope, thereby permitting the distance of the object from the forward end portion of the endoscope to be determined on the basis of the relative positions of the light spots in the field of view, said light projecting means being comprised of a fiber optical system extending from said control housing through said elongated tube to said forward end portion with the other end thereof adjacent to said control housing being supplied with light from an external light source, light being transmitted through said fiber optical system to the forward end thereof, a collimating lens system located in front of the forward end of said fiber optical system, a semi-transparent light reflecting mirror, and a total light reflecting mirror located in the optical axis of said collimating lens system, said total light reflecting mirror being spaced a certain distance from said semi-transparent light reflecting means, said two light reflecting mirrors being positioned opposite to each other with respect to said objective lens system, thereby permitting the reflected light beam to be directed toward the object within the field of view.

2. The device according to claim 1 comprising a control mechanism provided in said control housing for controlling the direction of at least one of said two light beams so that the direction of the beam is varied by the operation of said control mechanism so as to bring the light spot formed thereby on the surface of the object into a predetermined relation such as into registration with that formed by the other light beam thereby permitting the distance of the object from the forward end portion of the endoscope to be determined on the basis of the amount of the operation of said control mechanism.

3. The device according to claim 2 wherein the directions of both of said two light beams are adjustable.

4. The device according to claim 2 wherein the direction of one of said two light beams is controllable by rotating either said semi-transparent light reflecting mirror or said total light reflecting mirror by the operation of said control mechanism.

* * * * *